April 12, 1966 M. J. GEISLER ETAL 3,246,226
INVERTER NETWORK
Filed Aug. 23, 1962

WITNESSES
John F. Healey Jr.
James F. Young

INVENTORS
Martin J. Geisler &
Paul F. Pittman
BY John L. Houghton
ATTORNEY

3,246,226
INVERTER NETWORK
Martin J. Geisler and Paul F. Pittman, Pittsburgh, Pa., assignors to Westinghouse Electric Corporation, East Pittsburgh, Pa., a corporation of Pennsylvania
Filed Aug. 23, 1962, Ser. No. 219,031
14 Claims. (Cl. 321—2)

This invention relates generally to circuits for controlling the initiation of conduction of valve devices.

In many networks, such as inverter networks, care must be exercised so that the valve device associated with the circuit which supplies energy to the output terminals of the inverter in one-half cycle terminates its conduction prior to the initiation of conduction of the valve device which controls the power flow during the opposite half-cycle to prevent short circuiting. It is a prime object of this invention to provide means for rendering the starting circuit ineffective to cause firing of the control valve as long as current is flowing in the opposite one of the circuits of the network.

A further object of this invention is to provide a current sensitive device for biasing the control valve into its nonconducting condition as long as current is flowing through another one of the circuits of the network.

Figure 1:
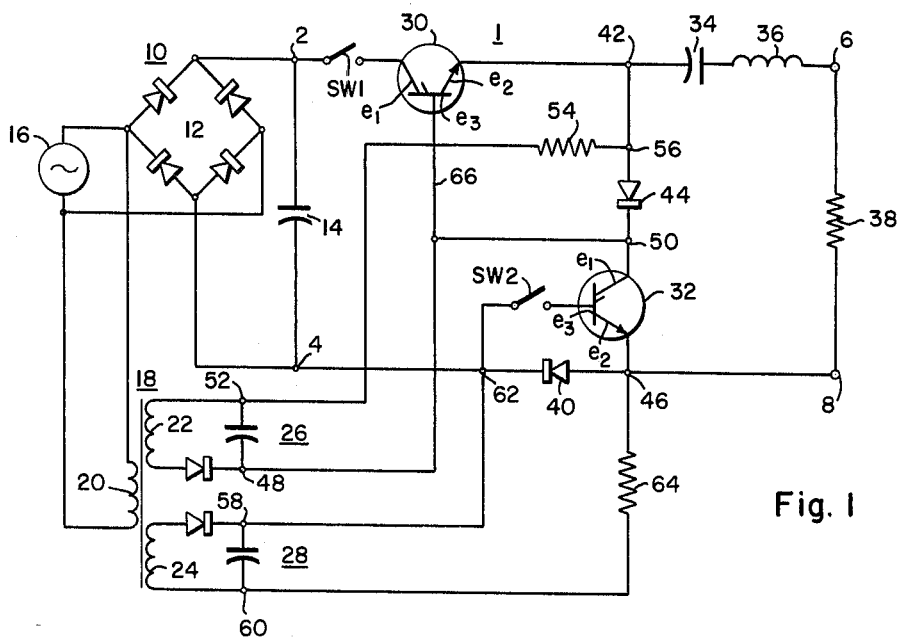
Figure 2:
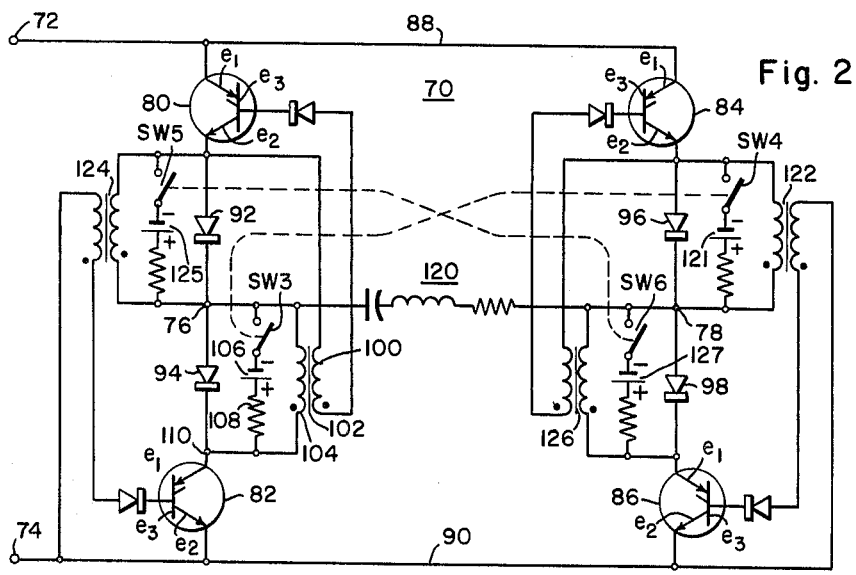

Other objects of the invention will be apparent from the description, the appended claims and the drawings, in which:

FIGURE 1 schematically illustrates an inverter embodying a preferred form of the invention; and FIG. 2 is a schematic view of a second form of the invention.

Referring to the drawings by characters of reference, the numeral 1 indicates generally an inverter network of the L-type having input terminals 2 and 4 and output terminals 6 and 8. Undirectional voltage may be supplied to the terminals 2 and 4 from any suitable source, as for example, a full wave rectifying device 10 comprising the usual rectifier network 12 and smoothing capacitor 14. The rectifying device 10 may be supplied with alternating potential from any convenient source as for example the diagrammatically illustrated source 16.

Control potential for the inverter network is derived from the source 16 through a transformer 18 having its primary winding 20 connected to the source 16. Secondary windings 22 and 24 of the transformer 18 are connected through half-wave rectifying networks 26 and 28 to the control circuits or paths of the semiconductor switching devices 30 and 32. These devices are preferably semiconductor devices of the PNPN type having main electrodes $e_1$ and $e_2$ and a control electrode $e_3$.

The positive input terminal 2 is connected through a switch SW1 to the main electrode $e_1$ of the switching device 30. The other main electrode $e_2$ of the device 30 is connected through a capacitor 34 and an inductance 36 to the output terminal 6. The resistance 38, connected between the output terminals 6 and 8, is illustrative of a load to be energized by the inverter network 1. The other output terminal 8 is connected through a rectifier 40 of any desired type to the negative input terminal 4. A terminal 42, common to the capacitor 34 and the device 30, is connected through a second rectifier 44 to the main electrode $e_1$ to the switching device 32, the other electrode $e_2$ of which is connected to a terminal 46 of the rectifier 40 which is connected to the output terminal 8.

The rectifiers 40 and 42 are preferably of a type having a low impedance to a current flow in a forward direction therethrough and having a high impedance to current flow in the other or reverse direction. The rectifiers 40 and 44 are connected in series with the devices 30 and 32 respectively and are poled with respect thereto so that forward current through the switching devices 30 and 32 is in the forward or low impedance direction in the rectifiers 40 and 44.

The positive output terminal 48 of the rectifying network 26 is connected to one terminal 50 of the rectifier 44 and the negative terminal 52 of the rectifier network 26 is connected through a voltage reducing device 54 such as a resistor to the other terminal 56 of the rectifier 44. Similarly, the positive and negative terminals 58 and 60 are connected between the rectifier terminals 62 and 46 through a voltage reducing device 64 which may take the form of a resistor. The networks 26 and 28 are polarized with respect to the rectifiers 44 and 40, to which they are connected, such that the voltage produced in the rectifier networks 26 and 28 is in a direction to provide current flow through the rectifiers 44 and 40 in the high impedance or reverse current flow direction.

A switch SW2 connects the rectifier terminal 62 to the control electrode $e_3$ of the switching device 32 and a conductor 66 connects terminal 50 to the electrode $e_3$ of device 30. The devices 30 and 32 are of the PNPN type in which the current flow through its main power path ($e_1$–$e_2$) is initiated upon the application of a critical potential between the control electrode $e_3$ and one of the main electrodes $e_1$ and $e_2$ which in the illustrated instance is between the electrodes $e_3$ and $e_2$.

The operation of the device is as follows. Upon closure of the switch SW1, a current will flow from the positive input terminal 2 through the switch SW1 through the power path ($e_1$–$e_2$) of the switching device 30 through the capacitor 34 and the inductance 36 to the output terminal 6. Current then flows from the terminal 6 through the load 38 to the terminal 8 and back through the rectifier 40 to the negative terminal 4. Current will continue to flow in this circuit until its magnitude falls below the critical maintaining current of the switching device 30. This occurs as a result of the charging of the capacitor 34. When, thereafter, the switch SW2 is closed, the rectifying network 28 will provide a current flow through the control path ($e_3$–$e_2$) of the switching device 32 to render the power path ($e_1$–$e_2$) of the switching device 32 conducting. This causes current to flow from the capacitor 34 through the rectifier 44, the main power path ($e_1$–$e_2$) of the device 32, load device 38 and inductance 36 to the other terminal of the capacitor 34. As long as a current is flowing in the forward direction through the rectifier 44, its terminal 56 is maintained positive with respect to its terminal 50 whereby the control terminal $e_3$ of the switching device 30 is maintained negative with respect to the main electrode $e_2$. This renders the network 26 ineffective to render the main path of the device 30 conducting. The voltage of the network 26 under these conditions appears across the voltage reducing device 54.

When, however, current flow through the rectifier 44 and switching device 32 decreased below the maintaining value of the device 32, the switching device 32 becomes nonconducting and the current flow in the forward direction through the rectifier 44 terminates. When this occurs, the rectifier 44 will exert a very high impedance to current flow therethrough due to the potential developed by the rectifying network 26 and current flows through the control path ($e_3$–$e_2$) of the device 30 thereby rendering its power path ($e_1$–$e_2$) conducting. Current then flows from the positive terminal 2 through the device 30, the capacitor 34, the inductance 36, the load 38 and rectifier 40 to the negative terminal 4. Current flow through the rectifier 40 in its forward direction maintains the terminal 46 thereof positive with respect to its terminal 62 to thereby render the network 28 ineffective to cause the power path ($e_1$–$e_2$) of the device 32 to conduct.

When, however, the capacitor 34 again becomes charged and the current flow through the device 30 and rectifier 40 reduces below the maintaining current of the device 30, the device 30 becomes nonconducting and current flow through the rectifier 40 in the forward direction ceases. When this occurs, the terminal 62 will be rendered positive with respect to the terminal 46 and current will flow trough the control path ($e_3$–$e_2$) of the device 32. As a consequence, capacitor discharge current will begin to flow through its power path ($e_1$–$e_2$) to discharge the capacitor 34 thereby rendering the network 26 ineffective to fire the device 30 until the current flow falls below the minimum maintaining value of the device 32, substantially as described above.

As long as the switches SW1 and SW2 are maintained closed, the network 1 will continue to oscillate substantially as described above at the oscillation frequency as determined by the relative magnitudes of the capacitor 34, the reactance 36 and the load 38. As illustrated, the load 38 is shown as being resistive and all of the reactive impedance is shown as being included in the capacitor 34 and the reactance 36. This may not be true in actual operation and some of the capacitance or reactance may appear in the load 38, however, as will be apparent it will not affect the nature of the circuit connected between the terminals 42 and 46.

The invention as lilustrated in FIG. 2 is embodied in a bridge-type of inverter network 70 having positive and negative direct current input terminals 72 and 74 and alternating current output terminals or connections 76 and 78. A fine set of valve devices 80 and 82 preferably of the semiconductor PNPN type each have main electrodes $e_1$, $e_2$ and a control electrode $e_3$, and a second set of valve devices 84 and 86. The sets of valve devices 80–82 and 84–86 are each series connected between the positive supplying bus 88 and the negative bus 90. A rectifier 92 is series connected with the valve device 80 intermediate its main electrode $e_2$ and the connection 76. A similar rectifier 94 is connected between the connection 76 and the main electrode $e_1$ of the device 82. Similarly, rectifiers 96 and 98 are connected between electrode $e_2$ of device 84 and connection 78 and connection 78 and electrode $e_1$ of device 86.

The control path ($e_2$–$e_3$) of the device 80 is connected across the secondary winding 100 of a control transformer 102 having its primary winding shunt connected about the rectifier 94. A source of control voltage diagrammatically shown as the battery 106, is connected in series with a voltage reducing device 108 across the end terminals of the primary winding 104. The battery 106 is polarized so that its positive terminal is connected through the reducing device 108 to the terminal 110 of the rectifier 94. The negative terminal of the battery 106 is connected through the terminal 76 to the rectifier 94. It will be apparent that when current is flowing between the connection 76 and the bus 90 through the main path ($e_1$–$e_2$) of the device 82, current will flow through the rectifier 94, in a low impedance direction, from the terminal 76 to its terminal 110 thereby maintaining the terminal 76 positive with respect to the terminal 110 by the voltage drop of the rectifier 94. Under these conditions, the current through the primary winding 104 will be in a direction to make the "dot" end negative. Similarly, the control paths of the devices 82, 84 and 86 are energized from transformers 124, 126 and 122, respectively, which are shunt connected with the rectifiers 92, 98 and 96, respectively. A suitable load circuit 120 is connected between the connections 76 and 78 and comprises capacitance, inductance and resistance series connected together which may comprise several elements or may be embodied into a single element.

The operation of the inverter of FIG. 2 is as follows: When it is desired to start operation of the inverter 70, direct current potential is applied between the terminals 72 and 74 to energize the positive and negative buses 88 and 90. Subsequently, the interconnected switches SW3 and SW4 are closed substantially simultaneously whereby the voltage sources 106 and 121 energize the transformers 102 and 122. This supplies conductive pulses to the control paths of the valve devices 80 and 86 which are thereupon rendered conductive. When these devices conduct, the current flows from the positive bus 88 through the main power path ($e_1$–$e_2$) of the device 80 through the rectifier 92, the load circuit 120, rectifier 98 and valve device 86 to the negative bus 90. Subsequently, the capacitor of the load circuit will reach a predetermined charged condition and current will cease flowing through this circuit. The current flow through the valve devices 80 and 86 will fall below the critical maintaining current and they will become nonconductive.

The connected switches SW5 and SW6 may be closed any time after the devices 80 and 86 commence conduction. As explained above as long as current flows forwardly through the rectifiers 92 and 98, the sources 125 and 127 are ineffective to energize the control paths of the devices 82 and 84. When, however, the devices 80 and 86 terminate conduction, the rectifiers 92 and 98 are no longer effective to prevent the energization of the control paths of the devices 82 and 84 which thereupon become conducting. Current then flows from the positive bus 88 through the valve device 84, rectifier 96, load circuit 120, rectifier 94, and valve device 82 to the negative bus 90. The capacitor of the network load circuit 120 will become fully charged in the opposite polarity and current through the valve devices 82 and 84 will cease. Thereafter, the valve devices 80 and 86 will again become conducting to again charge the capacitor to the original polarity. The inverter 70 will continue to oscillate as above described to energize the load 120 with potential of alternating polarity.

Although the invention has been described with reference to certain specific embodiments thereof, numerous modifications are possible and it is desired to cover all of the modifications falling within the spirit and scope of the invention.

What is claimed and is desired to be secured by United States Letters Patent is as follows:

1. In combination, an electric valve having three electrodes, a first pair of said electrodes defining a power path and a second pair of said electrodes defining a control path, means providing first and second connections to said control path, said control path being effective to initiate conduction through said power path when said first connection is positive with respect to said second connection, an asymmetric impedance device having a pair of terminals, said impedance device having a higher impedance to current flow when a first of said terminals is positive with respect to a second of said terminals than when the polarity of its said terminals is reversed, means directly coupling said first terminal to said first connection and said second terminal to said second connection, a pair of control terminals, means connecting a first of said control terminals to one of said impedance device terminals, and means connecting the second of said control terminals to the other of said impedance device terminals.

2. In combination, an electric valve having three electrodes, a first pair of said electrodes defining a power path and a second pair of said electrodes defining a control path, means providing first and second connections to said control path, said control path being effective to initiate conduction through said power path when said first connection is positive with respect to said second connection, an asymmetric impedance device having a pair of terminals, said impedance device having a higher impedance to current flow when a first of said terminals is positive with respect to a second of said terminals than when the polarity of its said terminals is reversed, means directly coupling said first terminal to said first connection and said second terminal to said second connection, a pair of control terminals, means connecting a first of said control terminals to one of said impedance device terminals, means connecting the second of said control elements to the other of said impedance device terminals, a source of control potential, circuit means connecting said control potential between said control terminals, said source of control potential having at least a first operating condition in which the one of said control terminals which is connected to said first impedance device terminal is positive with respect to the opposite one of said control terminals, and circuit means connected to said impedance device terminals and operable during certain intervals for causing said second terminal of said impedance device to become positive with respect to said first terminal of said impedance device.

3. In combination, an electric valve having three electrodes, a first pair of said electrodes defining a power path and a second pair of said electrodes defining a control path, means providing first and second connections to said control path, said control path being effective to initiate conduction through said power path when said first connection is positive with respect to said second connection, an asymmetric impedance device having a pair of terminals, said impedance device having a higher impedance to current flow when a first of said terminals is positive with respect to a second of said terminals than when the polarity of its said terminals is reversed, first and second current conducting networks, said first network including said power path, said second network including said impedance device and means for causing current flow through said impedance device from its second to its first terminal during certain intervals, a source of control voltage, a voltage dropping element, means directly connecting said source of voltage and said dropping element in series circuit with said impedance device, said source of voltage being effective at predetermined instants to render said first terminal positive with respect to said second terminal, and means connecting said first terminal to said first connection and said second terminal to said second connection.

4. A control network, a three terminal valve having a power path between a pair of said three terminals and a control path between the third of said terminals and one of said pair of terminals, said control path being operable as a consequence of being energized in a first polarity to render said power path conductive, a pair of terminals, a circuit connected across said pair of terminals and including inductance and capacitance and having a natural frequency at which energy is transferred between said inductance and said capacitance, an asymmetric current conducting device connected between said pair of terminals, a power supplying network connected to supply energy to said pair of terminals and including said power path, means connecting said asymmetric device across said control path, and a source of electrical control potential in shunt with said device, said control potential being effective to supply said first polarity to said control path during predetermined instants.

5. An electrical network, a resonant circuit having a pair of power input terminals and including an asymmetric device through which current flows during one half cycle of the resonating current in said circuit, a pair of supply terminals adapted to be energized from a source of unidirectional potential, an electric valve having a main circuit and a control circuit, a power supplying circuit interconnecting said input terminals with said supply terminals and including said main circuit, said power supplying circuit being effective when said main circuit is conducting to supply current to said resonant circuit during the other half cycle of the resonating current in said resonant circuit, an energizing circuit connected to said control circuit and effective to energize said control circuit with a first polarity for actuating said control circuit to render said main circuit conductive, and means connecting said asymmetric device in shunt with said control circuit, said asymmetric device being poled to provide its greater impedance to current flow due to said first polarity.

6. In combination, first and second valve devices, each said valve device having a main current path and a control circuit, first and second asymmetric current devices, translating means, a first current conducting path including said main path of said first valve device and said first asymmetric device and said translating means, a second current conducting path including said main path of said second valve device and said second asymmetric device and said translating means, a source of control potential, means connecting said source to said control circuit of said first valve device, said control potential being effective to render said control circuit effective to render its said main path conductive, means connecting said source to said control circuit of said second valve device in a polarity to render its said main path conductive, means connecting said second asymmetric device in shunt with said control circuit of said first valve device, and means connecting said first asymmetric device in shunt with said control circuit of said second valve device, each said asymmetric device being poled with respect to the said control circuit with which it is associated so as to present its larger impedance to current flow due to said control potential.

7. In an inverter, a pair of input terminals adapted to be energized from a source of unidirectional potential, a load device having impedance, reactive means having impedance, first and second semiconductor valve devices of the discontinuous control type, each said valve device having a main current path and a control circuit, first and second diode devices, a first current path energized from said input terminals and including said first valve device and said load device and said reactive means and said first diode device, a second current path including said load device and said reactive means and said second valve device and said second diode device, first and second sources of control potential, means connecting said first control potential source to said control circuit of said first valve device, means connecting said second control potential source to said control circuit of said second valve device, means connecting said second diode device in shunt with said control circuit of said first valve device, and means connecting said first diode device in shunt with said control circuit of said second valve device, said impedances including resistance and inductance and capacitance.

8. In an inverting network, a pair of input terminals adapted to be connected to a source of direct potential, a pair of output terminals adapted to be connected to a load, reactive impedance means, first and second valve devices, each said device having a main current path for conduction of current in a first direction and a control circuit for controlling at least the initiation of current flow through its associated said main path, first and second asymmetric current conducting devices having a relatively low impedance to current flow in a forward direction and a relatively high impedance to current flow in a reverse direction, a first power circuit interconnecting said pairs of terminals and including said reactive means and said main path of said first valve device and said first asymmetric device, said first asymmetric device being poled relative to said first valve device and to said reactive means such that current flows through said first valve device in its said first direction flows through said first asymmetric device in its said forward direction and in said reactive means in a first direction, a second power circuit interconnecting said output terminals and including said reactive means and said main path of said second valve device and said second asymmetric device, said second asymmetric device being poled relative to said second valve device and to said reactive means such that current flow through said second valve device is in its said first direction and flow through said second asymmetric device in its second forward direction and flow in said reactive means is in a reverse direction relative to said first direction of said reactive means, first and second pairs of control terminals, means energizing said pairs of control terminals such that one terminal of each said pair of control terminals is positive in potential with respect to the other terminal of each said pair of control terminals, first and second current limiting devices, a first control circuit connecting said first pair of control terminals to said control circuit of said first valve device for energizing said control circuit of said first valve device in a first polarity to render its associated said main path conductive, said first control circuit including said first current limiting device, means connecting said second asymmetric device in shunt across said control circuit of said first valve device, said second asymmetric device being poled to provide its said high impedance to current flow in said first polarity, a second control circuit connecting said second pair of control terminals to said control circuit of said second valve device for energizing said control circuit of said second valve device in one polarity to render its associated said main path conductive, said second control circuit including said second current limiting device, means connecting said first asymmetric device in shunt across said control circuit of said second valve device, said first asymmetric device being poled to provide its said high impedance to current flow in said one polarity.

9. An inverter comprising a pair of input terminals, first and second sets of valve devices, each said device including a power path and a control path, each said control path being effective upon becoming energized in a first polarity to render its respective said power paths conductive, each said set comprising two of said valve devices having their said power paths connected in series and provided with a connection intermediate its said series connected power paths, a network connected between said connections, a plurality of asymmetric current conducting devices having a low impedance to current flow in one direction and a high impedance to current flow in a second direction, means individually connecting said asymmetric devices in series circuit with said valve devices such that current through the said asymmetric device due to current flow through the said valve device with which it is associated is in said one direction, a plurality of transformers, each said transformer having a primary winding and a secondary winding, means individually connecting said primary windings in shunt circuit with said asymmetric devices, means individually connecting said secondary windings of said transformer associated with said asymmetric devices in series with a first of said valve devices of each said set across said control paths of the respective second of said valve devices with which said first devices are associated, means individually connecting said secondary windings of said transformers associated with said asymmetric devices in series with said second valve devices of each said set across said control paths of the respective said first valve devices with which said second valve devices are associated, a plurality of voltage dropping devices, a plurality of unidirectional potential sources, means individually connecting said dropping devices in series with said potential source to provide a plurality of series circuits, and means individually connecting said series circuits across one of said windings of said transformers in such polarity that the potential applied to the said winding by the said series circuit which is associated therewith is in opposite polarity to the potential applied to said one winding as a consequence of a current flow through the associated said asymmetric device in its said one direction.

10. In combination, first and second three element valve devices each said device having a power path interconnecting two of its said three elements and a control path interconnecting one of its said two elements and the third of its said three elements, each said control path being effective when energized in a first polarity to initiate current flow through the said power path of its said valve device and which is ineffective to initiate current flow through the said power path of its said valve device when energized in a polarity opposite to said first polarity, first and second asymmetric current conducting devices, each said device presenting a low impedance to current flow in a forward direction and a high impedance to current flow in a reverse direction, means connecting said first asymmetric device for current flow therethrough in its said forward direction as a consequence of current flow through said main path of said second valve device, means connecting said second asymmetric device for current flow therethrough in its said forward direction as a consequence of current flow through said main path of said first valve device, means connecting said control path of said first valve device in shunt with said first asymmetric device and in a polarity such that the potential drop thereacross due to current flow in its said forward direction is in said opposite polarity, means connecting said control path of said second valve device in shunt with said second asymmetric device and in a polarity such that the potential drop thereacross due to current flow in its said forward direction is in said opposite polarity, and means for selectively applying potentials to at least one of said connecting means in said first polarity.

11. An inverting netwowk, a pair of power input terminals adapted to be connected to a source of unidirectional potential, a pair of power output terminals adapted to be connected to an alternating potential load, first and second electric valves, each said valve having a main circuit and a control circuit for controlling at least the initiation of current flow through its said main circuit in response to the application of a control potential of a first polarity, first and second power paths connecting said pairs of terminals and including said main circuits of said first and second valves respectively, said first and second power paths being effective when conductive to energize said output terminals in first and second polarities respectively, a voltage supplying network connected to said control circuits and effective to supply said control potential of said first polarity to said control circuit of said valves, a first diode connected in series in said second path for forward current flow therethrough as a consequence of the current flow through said second path, said first diode further being connected in said voltage supplying network to shunt said control potential of said first polarity through said first diode in a reverse direction solely when current flows through said second path to prevent the application of said control potential to said control circuit of said first valve whereby said first power path may be rendered conductive solely subsequent to the termination of current flow through said second power path, and a second diode connected in series in said first path for forward current flow therethrough as a consequence of the current flow through said first path, said second diode further being connected in said voltage supplying network to shunt said control potential of said first polarity through said second diode in a reverse direction solely when current flows through said first path to prevent the application of said control potential to said control circuit of said second valve whereby said second power path may be rendered conductive solely subsequent to the termination of current flow through said first power path.

12. The combination of claim 11 in which said first and second means comprise diode switches traversed by the current flowing through said main circuits of said second and said first valves respectively for interrupting the application of said control potential.

13. In an inverting apparatus a pair of electric valves, each said valve having a main circuit for conduction of current in a first direction and a control circuit, said control circuit being effective to render its associated main circuit conductive in said first direction upon the application of a signal of a first polarity, a pair of diodes, each said diode having a first impedance to current flow in a first direction and a higher impedance to flow in a reverse direction, a pair of input terminals adapted to be energized from a source of unidirectional potential, means connecting said main circuits and said diodes in series circuit between said terminals for flow of current in said first directions, means connecting a first of said diodes across said control circuit of a first of said valves in a polarity such that the polarity of the voltage thereacross when said first diode conducts in its said first direction is in a polarity opposite to said first polarity, and means connecting a second of said diodes across said control circuit of a second of said valves in a polarity such that the polarity of the voltage thereacross when said second diode conducts in its said first direction is in a polarity opposite to said first polarity.

14. The combination of claim 13 in which there is provided an energy consuming circuit energized for current flow in one direction upon conduction of said main circuit of said first valve and said second diode in their said first directions and energized for current flow in a direction opposite to said one direction upon conduction of said main circuit of said second valve and said first diode in their said first directions.

References Cited by the Examiner
UNITED STATES PATENTS

| | | | |
|---|---|---|---|
| 3,067,378 | 12/1962 | Paynter | 307—88.5 |
| 3,074,008 | 1/1963 | McPhail et al. | 323—22 |
| 3,120,634 | 2/1964 | Genuit | 321—45 |

LLOYD McCOLLUM, *Primary Examiner.*

ROBERT L. SIMS, *Examiner.*

G. J. BUDOCK, J. C. SQUILLARO, *Assistant Examiners.*